Patented Feb. 4, 1930

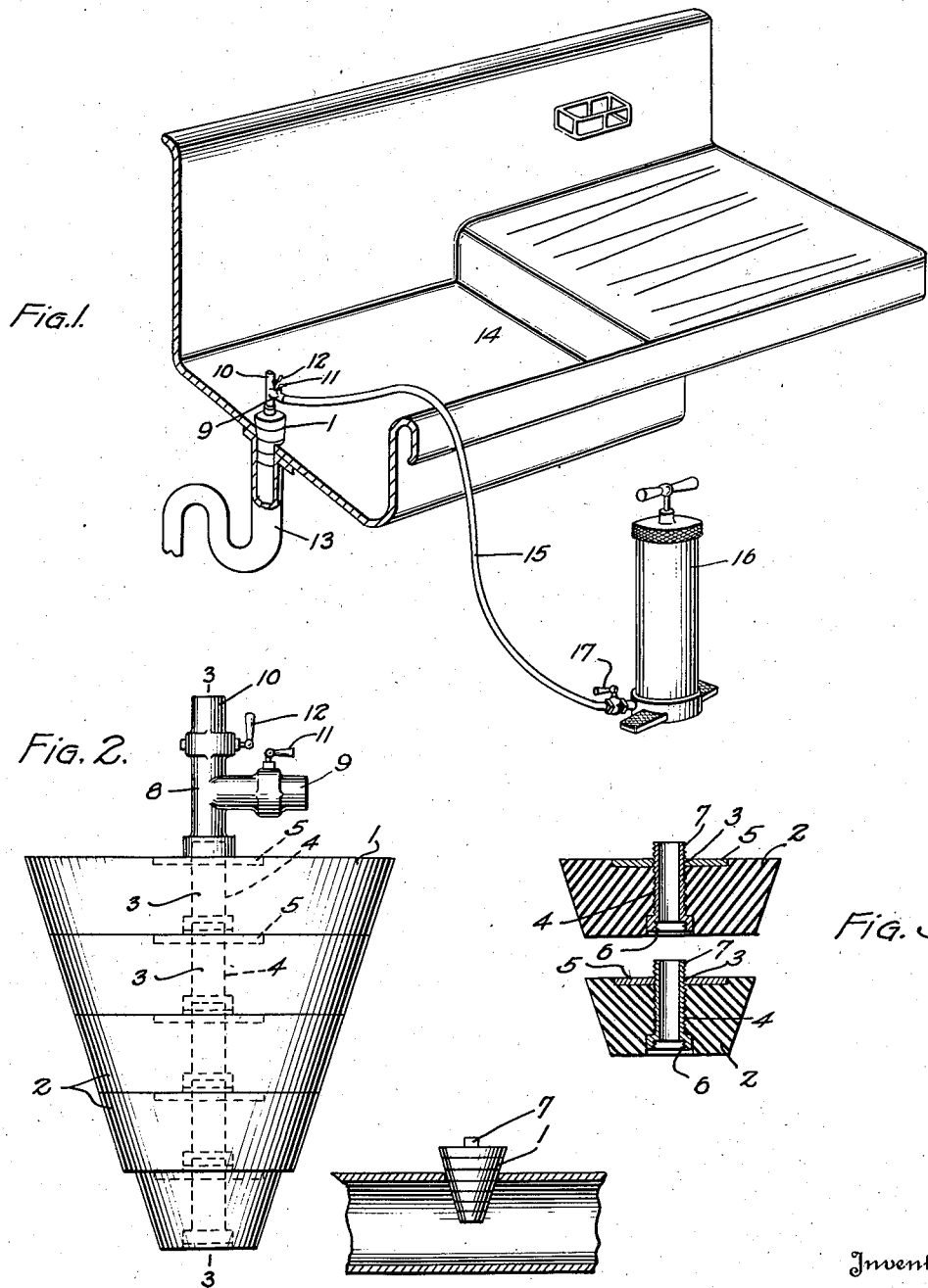

1,745,923

UNITED STATES PATENT OFFICE

CALFUS F. FRIZZELL, OF RICHMOND, VIRGINIA

SEWER PLUG

Application filed August 9, 1929. Serial No. 384,685.

My invention relates to sewer plugs and more particularly to those which may be adapted to unstop drain pipes, sewers, toilets and the like.

One of the objects of my invention is the provision of a plug for fitting pipes, or the like, of various diameters.

Another object of my invention is a plug capable of accommodating air, water or gas, in unstopping clogged pipes.

A still further object of my invention is the provision of a plug built in sections so as to accommodate pipes, and the like, of various diameters. Other objects and features will more fully appear from the following description and accompanying drawings, in which:

Fig. 1 is a perspective in sectional elevation, showing my plug adapted to one of its uses; Fig. 2, a plug in elevation; Fig. 3, a cross sectional view in detail along line 3—3 of Fig. 2, and Fig. 4, a sectional view of a pipe showing plug therein.

Referring to the drawings a conical plug 1 consisting of sections 2, made from any flexible material, such as rubber, are respectively molded or worked on pipes 3.

The pipes 3 are provided with external threads 4 which extend over the greater surface portion thereof so as to prevent lateral displacement between said section and pipe.

A threaded washer or locknut 5, adapted to register with the threaded pipe fits into a countersunk portion of said section and also acts to prevent lateral displacement in one direction.

A female member 6, having internal threads is adapted to engage a male member 7 of a similar section. The first named member may be shaped so as to form an abutment for preventing lateral displacement in a direction opposite that of aforesaid washer.

The sections 2 are made conical in shape and coincide when abutting each other, except under certain conditions hereinafter explained.

A T coupling pipe 8 having an air or gas inlet 9 and water inlet 10, respectively controlled by valves 11 and 12, is adapted to engage said male member 7. Both water and air inlets are provided with threads for connecting with a source of supply.

Quite often a pipe having a smaller diameter than the usual plug, is encountered, which makes such a plug impractical for use. By the provision of conical sections 1 I am enabled to obtain a plug suitable for any pipe diameter.

As shown in Fig. 2, it may be preferred to use a smaller section on larger sections in order to fit a pipe of smaller diameter without wasting time to form the conical plug.

By the provision of the female member's disposition in a countersunk portion of said section, the latter projects slightly beyond the former, and I am enabled to obtain a resiliency desirable when the plug is placed over a pipe, to form a tight joint, and not in it.

Another use of my plug is disclosed in Fig. 1, and operates as follows: The plug is inserted in a drain pipe 13 of the usual sink 14. A tube 15 is connected to the air inlet pipe and air tank 16. The tank is inflated and upon releasing valve 17 thereon, compressed air passes through said tube and plug into the drain pipe, thus unstopping and cleansing said pipe. The tube 15 may be connected to a source of water and operated in the same manner. It is obvious that if water is used to unstop a pipe the air inlet must be closed and vice-versa.

Having described my invention, I claim:

1. In a device of the character described the combination of a plurality of resilient sections, a plurality of pipes for respectively engaging said sections, and means for preventing lateral displacement of said sections with respect to said pipes.

2. In a device of the character described the combination of a plurality of conical resilient sections, a plurality of pipes respectively engaging said resilient sections, means for preventing lateral displacement of said sections with respect to said pipes, and a member having inlets therein controlled by valves and connected to one of said sections.

3. In a device of the character described the combination of a plurality of conical resilient sections, a plurality of pipes respectively engaging said resilient sections, male members projecting from said sections, female members in said sections and means for preventing lateral displacement of said sections with respect to said pipes.

4. In a device of the character described the combination of a plurality of conical resilient sections, a plurality of pipes respectively engaging said resilient sections, male members projecting from said sections, female members in said sections and means for preventing lateral displacement of said sections with respect to said pipes, and a member having inlets therein, connected to one of said male members.

In testimony whereof I have hereunto set my name this 25th day of July, 1929.

CALFUS F. FRIZZELL.